United States Patent
Zuckerman et al.

[15] 3,635,564
[45] Jan. 18, 1972

[54] SYSTEM FOR MEASURING ORGANIC CONTENT OF WATER

[72] Inventors: Mathew M. Zuckerman, Yonkers; Alan H. Molof, New City, both of N.Y.

[73] Assignee: Envirotech Corporation, Palo Alto, Calif.

[22] Filed: July 31, 1969

[21] Appl. No.: 846,335

[52] U.S. Cl. .................................................356/128, 23/253
[51] Int. Cl. ....................................G01n 21/46, G01n 29/02
[58] Field of Search ....................................356/72–73, 208, 356/103; 23/253

[56] References Cited

UNITED STATES PATENTS

| | | | |
|---|---|---|---|
| 2,868,216 | 1/1959 | Robertson | 356/130 X |
| 3,468,607 | 9/1969 | Sloane et al. | 356/73 |
| 3,498,719 | 3/1970 | Wing et al. | 356/208 X |

OTHER PUBLICATIONS

Fundamentals of Analytical Chemistry; Skoog et al.; Hol & Reinhart, and Winston; 1963; pp. 580–581.

Chemical Instrumentation; Strobel; Addison-Wesley Pub. Co.; pp. 417–419; 1960.

Primary Examiner—Ronald L. Wibert
Assistant Examiner—Conrad Clark
Attorney—Richard F. Bojanowski and Robert R. Finch

[57] ABSTRACT

A system for measuring the soluble organic content of a water sample by employing a refractometer which compares the refractive index of the water sample to the refractive index of a known or related water sample to obtain a measure of the total soluble content and then corrects this value for the content of the soluble inorganic material by use of an apparatus which compares the electrical conductivity of the water sample to the electrical conductivity of a known or related water sample. The system has the distinct advantage over existing methods of requiring minimal supervision, and short delay time before obtaining analytical results. Thus the system is particularly adapted for performance monitoring of a water treatment facility or for qualitatively monitoring the soluble organic content of a waterstream.

9 Claims, 2 Drawing Figures

SYSTEM FOR MEASURING ORGANIC CONTENT OF WATER

This invention relates generally to a method employing apparatus for quantitative measurement of the organic material contained in a water solution and more specifically to a system suitable for continuously and quickly determining the performance of a water treatment facility for removal of soluble organic material from the water.

The effectiveness of a water or wastewater treatment process if often measured by evaluating the systems removal of organic material from the water. Traditionally, the total organic content in wastewater has been determined by a biological oxidation process and a chemical oxidation process, respectively referred to as BOD (biochemical oxygen demand) and COD (chemical oxygen demand). However, the BOD and COD tests have several inherent disadvantages. In conducting these tests, there is a substantial time delay between the time the water sample is drawn and the time the results of the analysis are known. The BOD analysis has a 5-day time delay and the COD analysis has conventionally required a time delay of approximately 3 hours. To partially offset these disadvantages, an automated COD procedure has been developed which will produce results in one-half hour, but this is still too long for many applications such as monitoring the performance of a water or wastewater treatment process. Further, the BOD and COD procedures require experienced supervision during the performance of the tests and require that various chemical additions be made to the sample water which will add contaminants when the sample is returned to the normal waterflow.

It is thus a prime object of the present invention to measure the organic content of water more quickly and more efficiently than has heretofore been possible.

A related object of the invention is to provide a process and analytical instrument system, with a time lag of less than several minutes, that can be used to continuously evaluate the removal of organic material that occurs during wastewater treatment.

It is a further object of the present invention to provide a process and analytical instrument that can continuously measure the organic quality of a river, stream or other waterway without supervision.

A still further object of the present invention is to provide a process and analytical instrument system that will evaluate the organic content of water without the addition of chemicals for analysis so that the sample stream, after analysis, can be returned unaltered to the process streams or waterway.

A process for measuring the organic content of water demonstrating features and objects of the present invention comprises the steps of measuring the refractive index of the water sample in relation to the refractive index of a known or related solution to obtain a measure of the total soluble content of the sample, measuring the electrical conductivity of the water sample in relation to the electrical conductivity of a known or related solution to obtain a measure of the soluble inorganic content of the sample and correcting the measure of total soluble content in accordance with the measure of soluble inorganic content to reflect the soluble organic content of the sample.

Apparatus for measuring the organic content of water demonstrating features and objects of the present invention comprises a refractometer for measuring the refractive index of an unknown water sample relative to the refractive index of a known solution or relative to the refractive index of a second unknown water sample with which the first sample is to be compared, and conductivity measuring devices for measuring the electrical conductivity of the first unknown sample relative to the conductivity of the known or second unknown sample. The comparative refractive index measurement and the relative electrical conductivity measurements are both applied to a signal processor where the comparative refractive index is corrected by a factor proportional to the relative electrical conductivity. In a preferred embodiment of the invention, the correction is made by a network which subtracts from the differential refractive index measure a quantity related by an empirically predetermined constant to the difference in electrical conductivity between the first unknown and known or second unknown samples. The empirical constants will usually need to be predetermined for each specific application.

The above brief description as well as further objects, features and advantages of the present invention will be more fully appreciated by reference to the following detailed description of a presently preferred, but nonetheless illustrative, embodiment in accordance with the present invention, when taken in conjunction with the accompanying drawings, wherein.

An important measure of the performance of a wastewater treatment facility is the degree to which it removes organic material from wastewater. Since wastewater generally comprises a complex solution of organic and inorganic material, the concentration of soluble organic material has conventionally been measured by biological or chemical oxidation analytical techniques wherein the organic content of the water is measured as oxygen equivalents by chemical or biological addition. Both of these conventional tests require supervised performance of complex chemical routines. The system shown in FIG. 1 is adapted to monitor the performance of a water treatment facility 10 by comparing the organic content of the input water with the organic content of the output water to determine the degree of organic removal of the treatment facility quickly, without supervision, and without using chemical or biological additions.

Applicants have determined that the refractive index of a water solution is directly related to the quantity of dissolved soluble material. By measuring a solution's refractive index, and comparing it with the refractive index of a known solution, it is possible to obtain a relative indication of the quantity of soluble material in solution. Differential refractometers for analyzing the quantities of known substances dissolved in solution are currently available from several manufacturers. In the present invention, a differential refractometer 16 is employed to measure the relative difference in refractive index, and hence soluble content, between the input water flow and the output waterflow to treatment facility 10.

However, the soluble content of wastewater is composed of both organic and inorganic materials and the desired measure of the performance of treatment facility 10 is its removal of organic material only. The measure of differential refractive index must thus be corrected to eliminate from the refractive index measure that portion due to the concentration of inorganic soluble material. In the system shown in FIG. 1, this correction is made by measuring the electrical conductivity of the input water and the electrical conductivity of the output water and correcting the comparative measure of refractive index by a factor proportional to the difference in input and output conductivity. The conductivity correction is employed because the electrical conductivity of a solution is proportional to the free ion content of the solution which in turn is related to the quantity of dissolved inorganic material. Thus, the measurements of electrical conductivity, when compared, provide an indication of the difference in inorganic content between the input and output waters. By correcting the refractive index measurement of total soluble material by a factor proportional to the conductivity measurement of inorganic material an indication of the difference in soluble organic content of the input and output waters is obtained.

Figure 1:
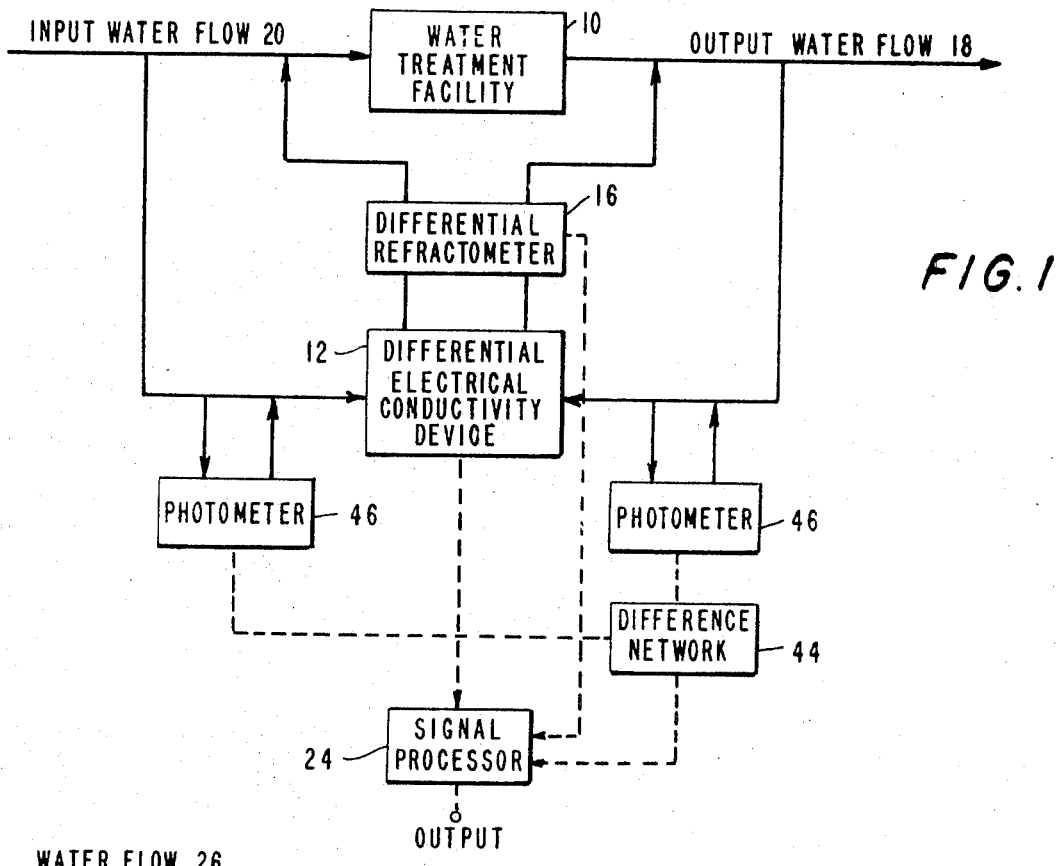
FIG. 1 is a diagrammatical representation of a system for monitoring the operation of a water treatment facility in accordance with the present invention wherein solid lines represent water paths and dotted lines represent electrical signal paths.

Specifically, the system of FIG. 1 is adapted to draw a sample from the influent waterflow to facility 10, shown figuratively by arrow 20, and to draw an effluent sample from the output waterflow shown by arrow 18 and to direct these samples to a differential electrical conductivity measuring device 12. Device 12 may include two conventional conductivity measuring instruments, each of which generates a signal proportional to the electrical conductivity of the respective waterflows 20 and 18, and a difference network for receiving the output of both electrical conductivity devices and subtractively combining these outputs to obtain a signal proportional to the difference in electrical conductivity between the input water and the output water. The difference network may comprise a differential amplifier or logic circuit or other circuit well known in the art. Alternately, device 12 may comprise a Wheatstone bridge circuit wherein two of the resistors in the bridge are two conductivity probes. This bridge circuit will automatically measure differential conductivity with great accuracy. Probes for measuring electrical conductivity of a water specimen are well known in the art and devices suitable for use in the system of FIG. 1 are manufactured by Industrial Instruments, Inc.

To obtain a relative measure of the refractive index of the input water sample as compared to the output water sample, the system of FIG. 1 includes a differential refractometer 16 of a type well known in the art. A refractometer suitable for use in the apparatus of FIG. 1 is manufactured by Waters Associates, Inc. As shown in the drawing, the influent and effluent samples for use in refractometer 16 are obtained from the electrical conductivity device 12. This is merely an efficient way of obtaining the samples, but it is to be understood that additional samples of the influent and effluent waters may be drawn separately for analysis in differential refractometer 16.

Both the differential electrical conductivity device 12 and differential refractometer 16 are conventionally designed to provide an electrical output in the form of a small signal proportional to the quantities being measured.

The output signal from device 12 and the output signal from differential refractometer 16 are applied to a signal processor 24 wherein the signals are combined to generate an output proportional to the extent to which treatment facility 10 removes organic material from wastewater being processed. As indicated above, the signal output of differential refractometer 16 is proportional to the degree to which facility 10 has removed all soluble material both organic and inorganic. The output of device 12 is proportional to the difference in the soluble inorganic material. Of course, while the outputs of networks 16 and 12 are proportional to soluble material removal and inorganic soluble material removal respectively, these signals must be adjusted by suitable constants before combination. Further, it is frequently desirable to calibrate the output of signal processor 24 in accordance with standard COD and/or BOD test results. This calibration can be accomplished empirically by conducting standard COD and/or BOD tests at the particular installation and comparing these test results with the output of signal processor 24. In certain limited circumstances, where the qualities of the input and output waterflows are well known, it will be possible to calibrate the output of processor 24 without making empirical measurements. However, in a presently preferred embodiment of the invention, calibration is accomplished empirically.

Figure 2:
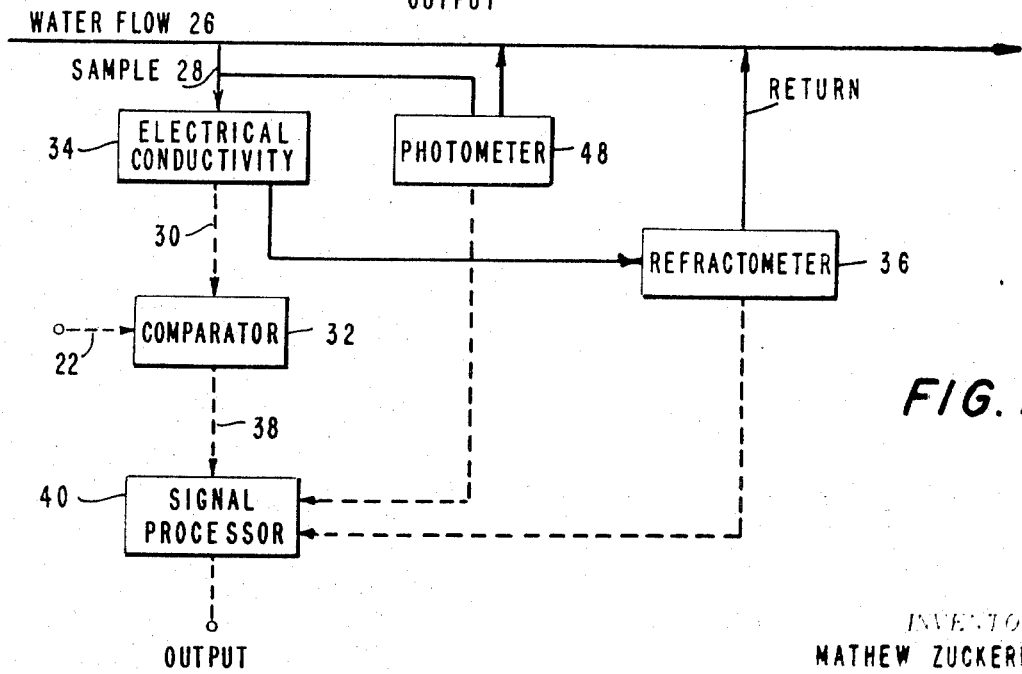
FIG. 2 is a similar diagrammatical representation of a system for monitoring the organic content of a water stream in accordance with the present invention.

The monitoring system shown diagrammatically in FIG. 2 is adapted to monitor the organic content of a waterflow. It is to be understood that a waterflow may comprise a natural waterway such as a river or stream or the water output from a municipal or industrial facility. The system of FIG. 2 is adapted to monitor the waterflow on a continuous basis to provide an indication of the organic content of the water. Essentially, the system of FIG. 2 operates according to the same principles demonstrated in the system of FIG. 1. The waterflow represented by solid line 26 is tapped at a selected point and a sample stream 28 is drawn off. The sample stream is applied to an electrical conductivity device 34 similar to the devices employed in the system of FIG. 1 wherein a known current is passed through a selected distance of solution and the resistance (or conductivity) of the solution is measured. A signal proportional to the electrical conductivity measure is applied along signal channel 30 to a comparator 32 wherein it is compared with the conductivity of a known solution sample, and an output signal proportional to the difference between the conductivity of water in stream 26 and the conductivity of the known sample, obtained from channel 22, is generated. This comparative conductivity signal is applied by signal channel 38 to a signal processor 40.

The output water of electrical conductivity device 34 is applied to refractometer 36 wherein the refractive index of the solution is measured. Again, the refractive index of the water sample is compared with the refractive index of a known sample. Refractometer 36 may be a differential refractometer similar to 16 in Fig. 1, with the second sample being a known water sample. Or, the known sample may be electrically built into the refractometer so that in either case output signal from refractometer 36 provides an indication of the relative refractive index of water sample 28 with respect to a known sample.

Signal processor 40 is similar to signal processor 24 in FIG. 1 in that it differentially combines the refractive index measure from refractometer 36 with the electrical conductivity measure from comparator 32 to produce an output signal reflective of the organic content of the waterflow. Again, suitable constants must be programmed into processor 40 and the relation between the output and standard BOD and COD measures of organic content may be determined empirically by conducting several BOD and/or COD analyses on the waterflow 26 and comparing the results of these analyses with the output signal.

The systems of FIG. 1 and FIG. 2 are adapted to monitor and measure the soluble organic content of water. Under some circumstances it is desirable to also determine the total organic content, both soluble and insoluble, of a waterstream or the total organic removal of a wastewater treatment facility. Since insoluble organic content of wastewater is approximately proportional to the wastewater's turbidity, this can be accomplished by measuring the turbidity of the sample water and comparing it with the turbidity of a known or related solution sample. Turbidity is preferably measured in a light scatter photometer such as photometers 46 in FIG. 1 and 48 in FIG. 2. In FIG. 1 the photometers 46 independently measure the turbidity of the output waterflow and the input waterflow and the resulting signals are combined in a difference network 44. The output of network 44 is applied to signal processor 24 wherein a signal proportional to the insoluble organic content of the water is added to the signal which appears at the output of processor 24. Similarly, the output of photometer 48 in FIG. 2 is applied to signal processor 40—it being understood that the output of photometer 48 is proportional to the difference between the turbidity of water sample 28 and that of a known solution.

Further, under some circumstances it is desirable to also determine total quantity of organic material, both soluble and insoluble, in addition to concentrations. This can be accomplished by measuring the quantity of water in conjunction with the systems of FIGS. 1 and 2 by use of a flow-measuring device such as a Parshal flume or other suitable device well known in the water measurement art.

It is to be understood that the above described arrangements are merely examples of the application of the principles of the present invention. Numerous additional arrangements will be apparent to those skilled in the art without departing from the spirit or scope of the present invention.

What is claimed is:

1. Apparatus for continuously measuring the soluble organic content of a first water sample containing dissolved solids relative to a second water sample containing dissolved solids comprising means for deriving a first signal proportional to the difference between the refractive index of said first water sample used as a reference and the refractive index of said second water sample, means for deriving a second signal proportional to the difference between the electrical conductivity of said first water sample used as a reference and the electrical conductivity of said second water sample, means for deriving a third signal proportional to the difference between said first signal and said second signal, and output means for receiving said third signal and generating an indication of the soluble organic content of said first water sample relative to said second water sample.

2. Apparatus in accordance with claim 1 for monitoring the organic content of a waterstream wherein the refractive index and the electrical conductivity of said first water sample are selected constants.

3. Apparatus for monitoring the performance of a water treatment facility having a reference input stream containing dissolved solids and an output stream containing dissolved solids comprising means for drawing a sample of the water in said reference input stream, means for drawing a sample of the water in said output stream, means for measuring the electrical conductivity of the water in said reference input sample, means for measuring the electrical conductivity of the water in said output sample, means for determining the conductivity difference between said input electrical conductivity and said output electrical conductivity, means for measuring the refractive index difference between the refractive index of said reference input sample and the refractive index of said output sample, and means for correcting said refractive index difference in accordance with said conductivity difference to produce an indication of the quantity of soluble organic material removed by said water treatment facility.

4. Apparatus in accordance with claim 3 wherein said means for measuring the refractive index difference comprises a differential refractometer.

5. Apparatus in accordance with claim 3 wherein said means for correcting said refractive index difference comprises means for subtracting a factor proportional to said conductivity difference from said refractive index difference.

6. Apparatus in accordance with claim 3 further including means for measuring the turbidity of the water in said input stream, means for measuring the turbidity of the water in said output stream, and means for correcting said indication of the proportion of soluble organic removal by a factor proportional to the comparative turbidity between said input and output streams to provide an indication of the proportion of total organic removal.

7. A process for measuring the organic content of a wastewater sample comprising the steps of measuring the refractive index of said wastewater sample, measuring the electrical conductivity of said wastewater sample, comparing said refractive index and said electrical conductivity with the refractive index and electrical conductivity of a known reference solution and correcting the comparison between said refractive indices in accordance with the comparison between said electrical conductivities to determine the soluble organic content of said wastewater sample.

8. A process for measuring the relative organic content of a first water sample containing dissolved solids relative to a second water sample containing dissolved solids comprising the steps of measuring the refractive index of said first water sample used as a reference relative to the refractive index of said second water sample, measuring the electrical conductivity of said first water sample used as a reference relative to the electrical conductivity of said second water sample, correcting said relative refractive index in accordance with said relative electrical conductivity to derive a measure of the relative organic content of said first water sample relative to said second water sample.

9. A process for measuring the relative organic content of a water sample in accordance with claim 8 further including means for measuring the turbidity of the water in said first water sample used as a reference, means for measuring the turbidity of the water in said second water sample, and means for correcting said indication of the proportion of soluble organic removal by a factor proportional to the comparative turbidity between said first water sample and said second water sample to provide an indication of the proportion of total organic removal.

* * * * *